(12) United States Patent
Thomas et al.

(10) Patent No.: US 8,920,648 B2
(45) Date of Patent: Dec. 30, 2014

(54) NO FILTER NO RUN FLUID FILTRATION SYSTEMS

(75) Inventors: Chad M. Thomas, Cookeville, TN (US);
Eric R. Burgan, Baxter, TN (US);
Philip S. Hall, Cookeville, TN (US);
Carey A. Curt, Cookeville, TN (US);
Kevin C. South, Cookeville, TN (US);
Jeffrey A. Husband, Cookeville, TN (US); Chad T. Brummitt, Algood, TN (US)

(73) Assignee: Cummins Filtration IP Inc., Minneapolis, MN (US)

(*) Notice: Subject to any disclaimer, the term of this patent is extended or adjusted under 35 U.S.C. 154(b) by 1184 days.

(21) Appl. No.: 12/707,014

(22) Filed: Feb. 17, 2010

(65) Prior Publication Data

US 2010/0213115 A1 Aug. 26, 2010

Related U.S. Application Data

(60) Provisional application No. 61/155,209, filed on Feb. 25, 2009.

(51) Int. Cl.
*B01D 35/153* (2006.01)
*B01D 29/21* (2006.01)

(52) U.S. Cl.
CPC .............. *B01D 35/153* (2013.01); *B01D 29/21* (2013.01); *B01D 2201/295* (2013.01); *B01D 2201/316* (2013.01); *B01D 2201/4084* (2013.01)
USPC ........................................................ 210/235

(58) Field of Classification Search
CPC .................................................... B01D 35/153

USPC ................................................... 210/234, 235
See application file for complete search history.

(56) References Cited

U.S. PATENT DOCUMENTS

| | | | |
|---|---|---|---|
| 5,855,780 A * | 1/1999 | Dye et al. ...................... 210/234 |
| 6,171,491 B1 | 1/2001 | Popoff et al. |
| 6,495,042 B1 | 12/2002 | Knight |
| 6,554,139 B1 | 4/2003 | Maxwell et al. |
| 6,884,349 B1 | 4/2005 | Jiang |
| 2001/0042707 A1 | 11/2001 | Niers et al. |
| 2007/0039864 A1 | 2/2007 | Dworatzek et al. |
| 2008/0179236 A1 | 7/2008 | Wieczorek et al. |
| 2008/0283463 A1 | 11/2008 | Hawkins et al. |

(Continued)

FOREIGN PATENT DOCUMENTS

DE 102005021957 A1 * 12/2005

OTHER PUBLICATIONS

International Search Report for application No. PCT/US2010/024545, dated Sep. 27, 2010 (3 pages).

(Continued)

*Primary Examiner* — Thomas M Lithgow
(74) *Attorney, Agent, or Firm* — Foley & Lardner LLP

(57) ABSTRACT

Improvements to "no filter, no run" fluid filtration systems are described. In one example, a filter includes a movable pin cage that has a first pre-installation position adjacent the bottom end plate and is temporarily connected thereto by a snap connection system, and a second position adjacent the upper end plate where it performs a valve interaction function. In another example, a filter includes non-centered valve pins that are rotatable relative to an upper end plate of the filter.

10 Claims, 12 Drawing Sheets

(56) References Cited

U.S. PATENT DOCUMENTS

| | | |
|---|---|---|
| 2009/0020465 A1 | 1/2009 | Jiang et al. |
| 2009/0045109 A1 | 2/2009 | Abdalla et al. |
| 2009/0065419 A1 | 3/2009 | Jiang |
| 2009/0065427 A1 | 3/2009 | Jiang |
| 2009/0242816 A1 | 10/2009 | Husband et al. |
| 2009/0242820 A1 | 10/2009 | Husband et al. |

OTHER PUBLICATIONS

Written Opinion of the International Searching Authority for application No. PCT/US2010/024545, dated Sep. 27, 2010 (4 pages).

* cited by examiner

NO FILTER NO RUN FLUID FILTRATION SYSTEMS

This application claims the benefit of U.S. Provisional Application No. 61/155,209, filed Feb. 25, 2009, and which is incorporated herein by reference in its entirety.

FIELD

This disclosure generally pertains to the field of filtration, and more particularly to fluid filtration systems designed to safe-guard against damage to components such as fuel injectors and associated fuel components, and system malfunctions resulting from a missing or incorrect fluid filter.

BACKGROUND

It is known to use a valve in a fuel filter housing to control fuel flow through the housing. One example of such a valve in a fuel filter housing is sometimes referred to as a "no filter, no run" valve, where the valve prevents flow of fuel to the engine if no fuel filter is installed or if the incorrect fuel filter is installed. In this type of system, not only must a fuel filter be present, but the correct fuel filter must be used, in order to allow fuel to flow past the valve to the engine in sufficient quantities to allow the engine to function properly.

SUMMARY

Improvements to "no filter, no run" fluid filtration systems are described. In a "no filter, no run" fluid filtration system, fluid flow to a downstream component(s) is prevented if a filter cartridge is not installed, and an appropriately designed filter cartridge is required to be installed in order to permit fluid flow. This safeguards against damage to downstream components and malfunctions of equipment in which the fluid filtration system is used. The type of "no filter, no run" fluid filtration systems that can utilize the described improvements can be a number of systems including, but not limited to, a fuel filtration system, for example on an engine such as a diesel or gasoline engine, a hydraulic fluid filtration system in a hydraulic system, other engine fluid filtration systems on diesel or gasoline engines, as well as filtration systems used in non-engine applications.

As described herein, an improved filter or filter cartridge useable in a no filter, no run system can include filter media having first and second ends and defining an interior space, a first end plate connected to the first end of the filter media, a second end plate connected to the second end of the filter media, and a valve interaction pin disposed within the interior space, the valve interaction pin being moveable relative to the filter media from a first position to a second position.

The filter cartridge can be designed for installation into a filter housing having a standpipe defining a fluid passageway, there being a valve in the standpipe that controls fluid flow through the standpipe. In this case, the filter cartridge includes filter media having an upper end and a lower end and defining an interior space, and an upper end plate connected to the upper end of the filter media, where the upper end plate is without fluid flow openings. A bottom end plate is connected to the lower end of the filter media and includes a standpipe opening that allows passage of the standpipe through the bottom end plate when the filter cartridge is installed into the filter housing. A gasket surrounds the standpipe opening for sealing with the standpipe when the filter cartridge is installed in the filter housing. A valve interaction pin disposed within the interior space that is configured to interact with the valve in the standpipe when the filter cartridge is installed in the filter housing, where the valve interaction pin is moveable relative to the filter media during installation into the filter housing from a first position to a second position.

In one specific embodiment, a filter is described that includes a movable pin cage that has a first pre-installation position adjacent the bottom end plate and is temporarily connected thereto by a snap connection system, and a second position adjacent the upper end plate where it performs its valve interaction function. At the first position, the pin cage helps to block entry of contaminants into the interior of the filter. At the second position, a pin of the pin cage interacts with a valve at the end of a fluid flow standpipe that is part of the filter housing. The interaction between the pin and the valve can be to prevent a valve from reaching a flow blocking position, or the pin can actuate the valve to an open position allowing fluid flow.

In another specific embodiment, a filter includes non-centered valve pins that are rotatable relative to an upper end plate of the filter. Upon installation of the filter, an automatic alignment feature causes the non-centered valve pins to align with openings in the end of a valve housing to allow the valve pins to interact with the valve, for example to actuate the valve to an open position or to prevent a valve from reaching a flow blocking position. The non-centered valve pins can interact with a valve that is designed to prevent valve flutter during use. Another function of the pins is to hold the valve to protect the valve and prevent damage during fluid flow when the valve is in the open position by holding the valve stable and away from other valve components.

DRAWINGS

DETAILED DESCRIPTION

Figure 1:
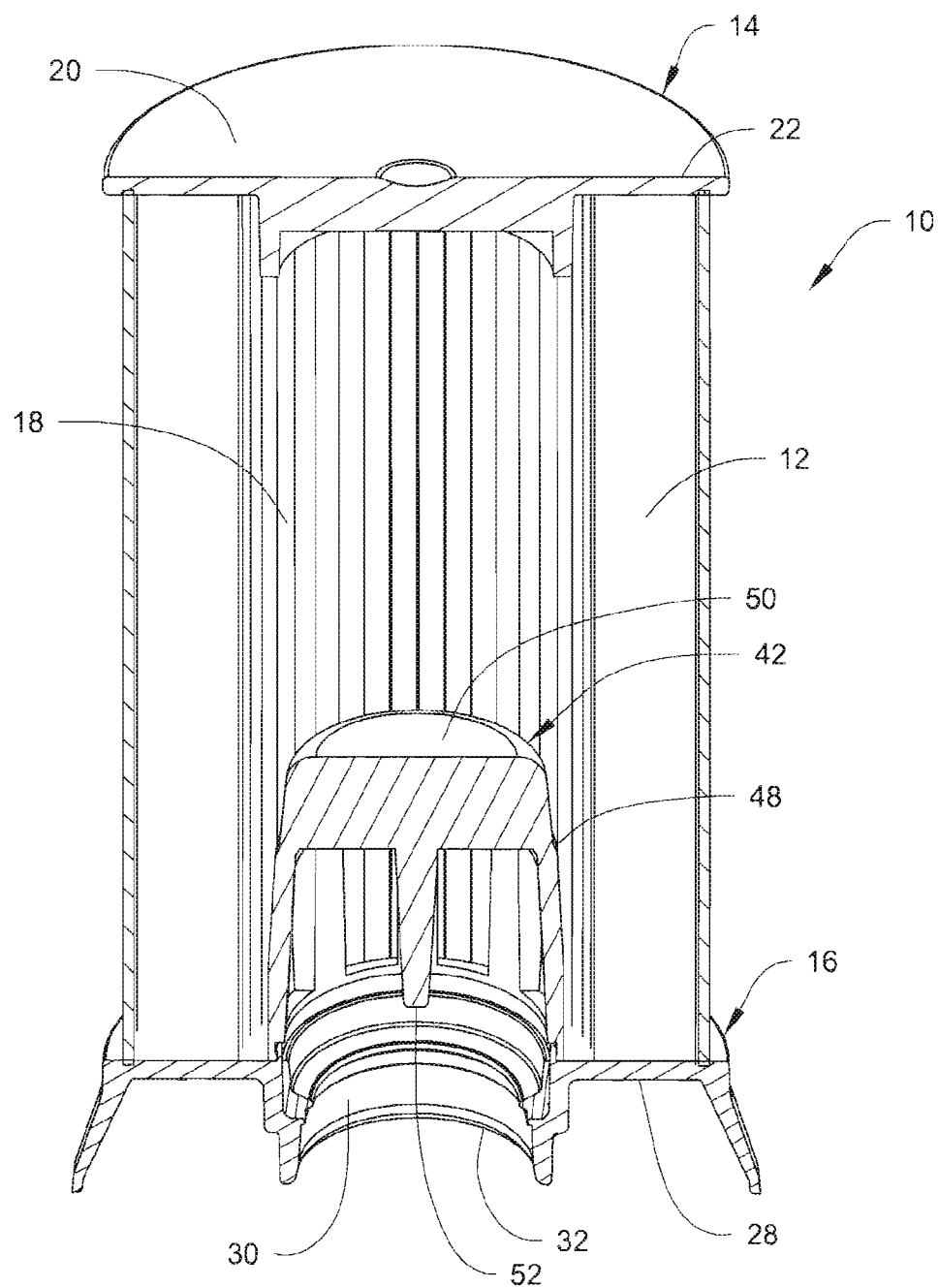
FIG. 1 is a perspective, sectional view of an improved filter cartridge.

FIG. 1 illustrates an inner filter 10 of a filter-in-filter type filter cartridge, for example a filter-in-filter fuel cartridge, which is intended to filter a fluid, for example diesel fuel, before the fluid reaches a protected system, for example a fuel injection pump and fuel injectors. This description will hereinafter describe the fluid as fuel. However, it is to be realized that the concepts described herein can be used for other fluids. For example, in appropriate circumstances, one or more of the concepts described herein can be applied to other types of filter cartridges that filter other types of fluids, for example lubrication, hydraulic and other liquids, as well as air.

The inner filter 10 is designed to cooperate with an outer filter 5 (visible in FIGS. 5-9), together forming a filter cartridge that filters the fuel. The outer filter 5 can be designed to remove water from the fuel, the water then settling down to the bottom of the filter housing in which the filter cartridge is installed. The inner filter 10 can be designed to filter particles from the fuel before the fuel enters the center of the filter cartridge. The inner filter also strips remaining water from the fuel and prevents the water from entering the filter media of the inner filter. Further information on filter-in-filter fuel filter cartridges can be found in U.S. application Ser. Nos. 11/937, 700, 11/851,033 and 11/851,180 which are incorporated herein by reference.

Although the inner filter 10 is described as being part of a filter-in-filter style filter cartridge, the concepts described herein can be applied to a single-stage style filter cartridge where the inner filter 10 is the only filter of the filter cartridge. Therefore, the description of the filter 10 herein, including any reference to the filter 10 as a filter cartridge, is intended to encompass examples where the filter 10 is an inner filter of a filter-in-filter style filter cartridge, as well as examples where the filter 10 is the only filter of a single-stage filter cartridge.

As will be discussed further below, the filter 10 is designed with features intended to interact with a valve disposed in a filter housing in which the filter is installed. When the filter 10 is properly installed, the interaction between the filter 10 and the valve allows fuel to flow past the valve to downstream components after the fuel is filtered by the filter. If the filter 10 is not properly installed, or an incorrect filter not designed with appropriate features is installed, the valve is not engaged and prevents fuel from flowing to downstream components. This concept of a "no filter, no run" system is discussed further in U.S. Pat. No. 6,884,349 as well as U.S. application Ser. No. 11/937,700.

The filter 10 includes filter media 12, an upper end plate 14 secured to an upper end of the media 12 and closing the upper end, and a lower end plate 16 secured to a bottom end of the media 12. The ends of the filter media 12 are secured to the end plates 14, 16 in any suitable manner, for example embedding the media into the end plates or by using an adhesive to adhere the media to the end plates. The end plates 14, 16 can be, for example, plastic.

The filter media 12, which in the illustrated example is a cylindrical ring, defines an interior space 18. The filter media 12 can take on any shape, for example cylindrical ring, triangular, oval, as long as it defines the interior space 18. The interior space 18 defines a clean fuel side that receives filtered fuel that has been filtered by the media 12, in which case the filter 10 is configured for outside-in flow. The filter 10 could also be constructed for inside-out flow, in which case the interior space 18 is the dirty fuel side and fuel flows outwardly through the filter media 12 to a clean fuel side.

The filter media 12 is designed to remove unwanted contaminants from the fuel. For example, the filter media 12 can be configured to remove soft and solid particulate contaminants and/or water from the fuel.

Figure 2:
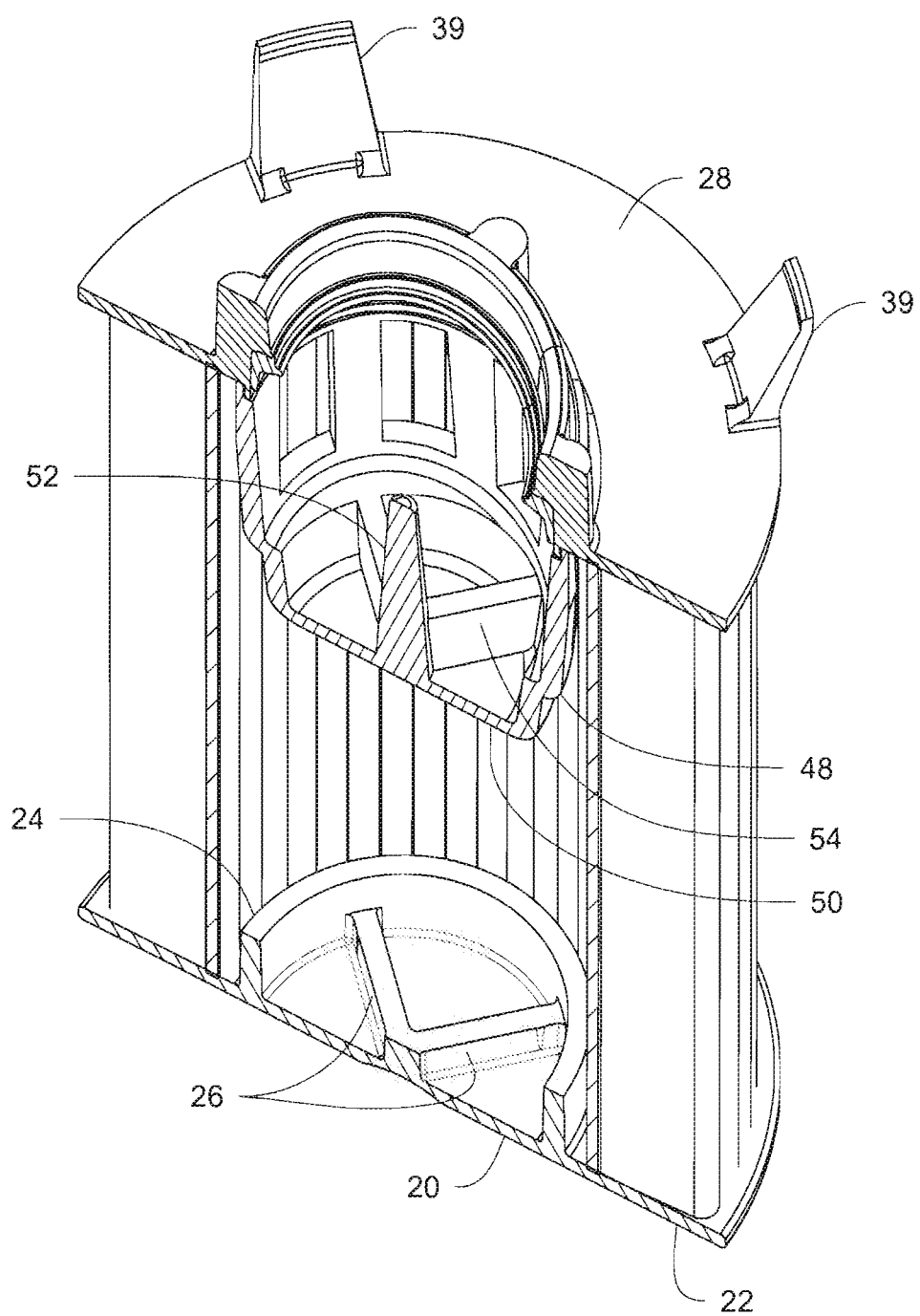
FIG. 2 is a perspective, sectional view of the filter cartridge of FIG. 1 in an inverted orientation.

With reference to FIGS. 1 and 2, the upper end plate 14 is closed, i.e. there are no openings for fuel to flow therethrough.

The upper end plate 14 includes a generally circular, horizontal plate 20 with a perimeter portion 22 that is attached to the upper end of the filter media 12. A circular flange 24 is formed on the inside of the plate 20 facing and extending into the interior space 18. A plurality of stiffening ribs 26 extend from the center of the plate 20 outward into engagement with the interior of the flange 24 to stiffen the flange 24. The axial height of the ribs 26 is less than the axial height of the flange 24 so that a space is left between the bottom ends of the ribs and the bottom end of the flange. The space will receive a portion of a pin cage described further below.

With continued reference to FIGS. 1 and 2, the bottom end plate 16 comprises a generally circular plate 28 with a central opening 30 configured to allow passage of a standpipe of a filter housing in which the filter 10 is to be installed. The bottom end of the media 12 is connected to the plate 28.

Figure 4:
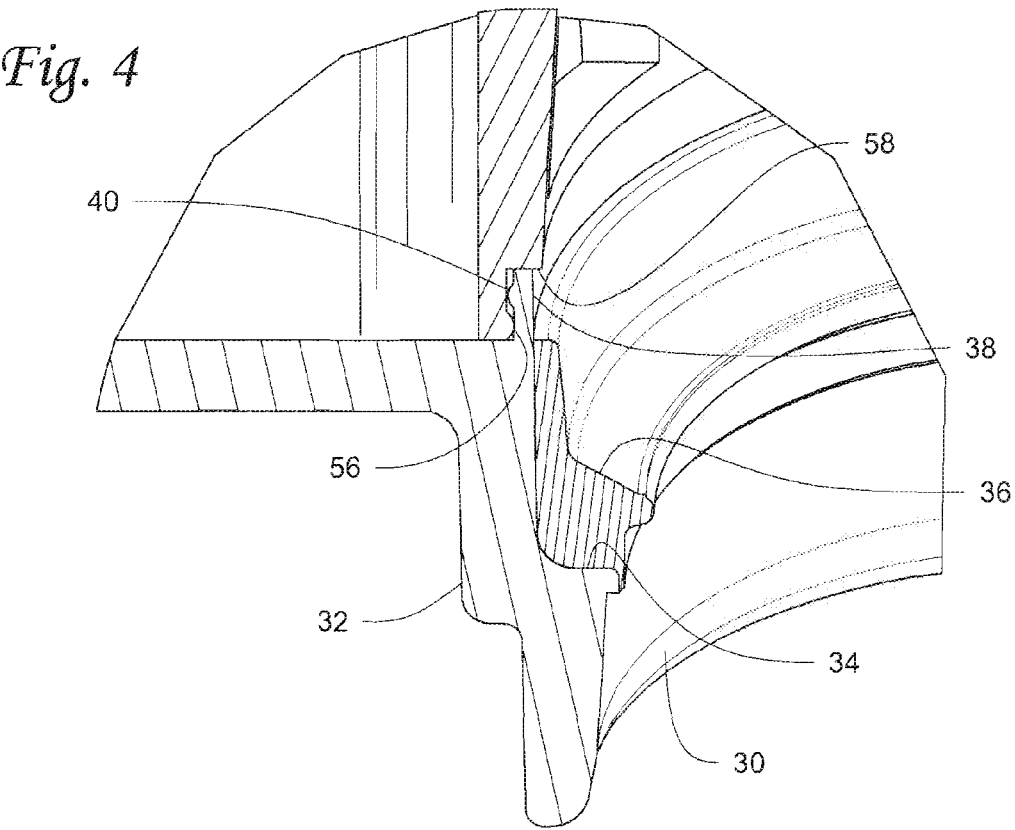
FIG. 4 is a detailed sectional view illustrating the connection between the pin cage and the bottom end plate prior to installation.

As shown in FIG. 4, a flange 32 projects downwardly from the plate 28 and helps define the opening 30. The flange 32 defines a ledge 34 on which is disposed a gasket 36 designed to seal with the external surface of the standpipe when the filter cartridge is installed. Projecting upwardly from the plate 28 opposite the flange 32 is a lip 38. The lip 38 is circumferentially continuous and includes a radially outward facing (i.e. facing the interior of the filter media 12), circumferentially continuous bulge 40 that forms part of a snap connection system designed to temporarily hold the pin cage discussed below. The bulge 40 could be discontinuous (i.e. non-circumferentially continuous) if desired. The plate 28 further includes a plurality of circumferentially spaced flexible connection arms 39 that extend downwardly from the plate at an angle. The arms 39 are designed to snap-fit connect with a bottom end plate on the outer filter 5 in a manner disclosed in U.S. application Ser. No. 11/851,180 for connecting the inner filter 10 to the outer filter 5. If the filter 10 is used as a single-stage filter cartridge, then the arms 39 are not necessary.

The pin cage 42 is best seen in FIGS. 1-4. The pin cage 42 forms a means for interacting with a valve that is disposed at the end of the standpipe. Depending on the type of valve that is present on the standpipe, the pin cage 42 includes means to prevent an open valve from closing by obstructing a flow opening and the same means can function to actuate a valve from a closed to an open position. The pin cage 42 is also constructed to help prevent contaminants from entering the interior space 18 before installation of the filter cartridge onto the standpipe, for example during shipping and after unpackaging but prior to installation.

The pin cage 42 is constructed to be moveable from a first, pre-installation position adjacent the bottom end plate 16 and temporarily connected thereto by the snap connection system, to a second position adjacent the upper end plate 14 where it performs its valve interaction function. At the first position, the pin cage 42 helps to block entry of contaminants through the opening 30 and into the interior space 18 which forms the filtered fuel side of the media 12. At the second position, the pin cage 42 interacts with the valve at the end of the standpipe and, in some embodiments, ensures that the valve is properly engaged.

The pin cage 42 comprises a cylindrical, hollow skirt 44 that includes a bottom rim 46 and a top rim 48. As shown in FIGS. 1 and 2, the top rim 48 is connected to a tapered, hollow cap 50. The upper portion of the cap 50 is sized to fit within the space defined by the flange 24 and ribs 26 on the upper end plate 14. The cap 50 including its upper portion is devoid of openings to block fluids and particles from entering the space 18 when the pin cage is at the first position. Extending downwardly from the cap 50 on the inside thereof is an integral pin 52. A plurality of ribs 54 extend from the inside surface of the cap 50 to the pin 52 to help stiffen the pin.

The bottom rim 46 of the skirt 44 includes a pair of radially inward facing, opposed protrusions 56 that interact with the continuous bulge 40 and together form the snap connection system to temporarily hold the pin cage at the first position. The retaining force provided by the protrusions 56 and the bulge 40 should be sufficient to prevent casual release of the pin cage prior to installation. The number and size of the protrusions 56 help determine the holding force. The protrusions 56 extend for only a limited circumferential extent on the rim 46. In the illustrated example, the rim 46 and the lip 38/standpipe opening 30 are oval-shaped in lateral cross-section, and the skirt 44 and lip 38 are aligned oval to oval to permit engagement of the protrusions 56 and bulge 40. In the case of a rim and lip 38/standpipe opening 30 that are circular, the skirt 44 can be assembled in any orientation relative to the bottom end plate and still have the protrusions 56 engage with the bulge 40.

Figure 3:
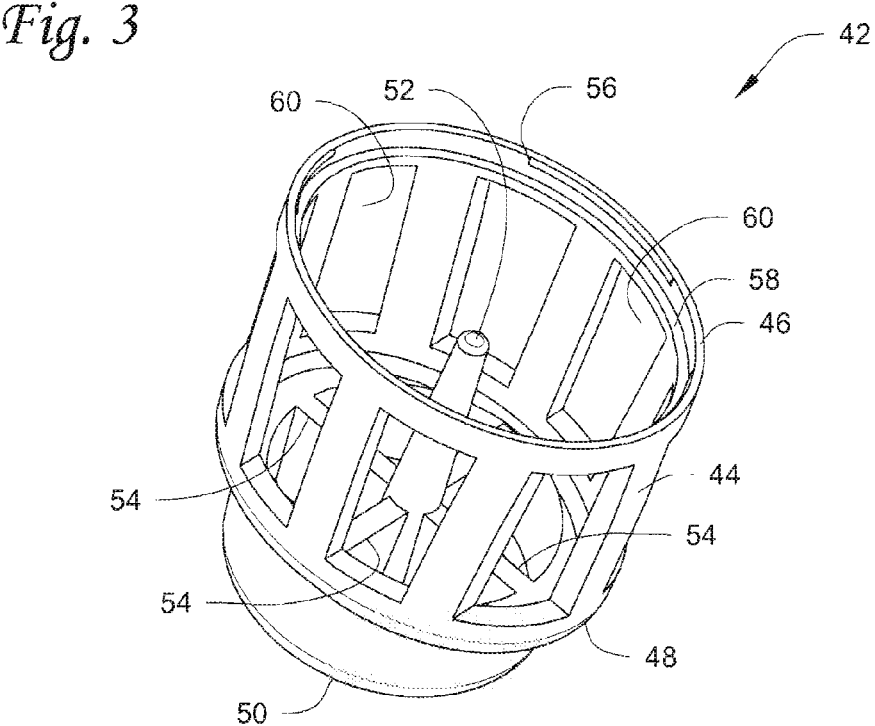
FIG. 3 is a perspective view of a pin cage used with the filter cartridge of FIGS. 1 and 2.

With reference to FIGS. 3 and 4, a ridge 58 extends around the bottom rim 46 above the protrusions 56. At the first position of the pin cage 42 shown in FIGS. 1, 2, and 4, the protrusions 56 are disposed below the bulge 40 and the ridge 58 rests on the top edge of the lip 38. Interference between the protrusions 56 and the bulge 40 helps retain the pin cage at the first position, preventing movement of the pin cage toward the second position. When sufficient force is applied upwardly on the pin cage, the retaining force between the protrusions and the bulge is overcome, at which point the protrusions 56 deflect over the bulge 40 releasing the pin cage and allowing the pin cage to move toward the second position.

The pin cage 42 can be made of any material one finds suitable to use for the intended purpose of the pin cage. For example, the pin cage 42 can be made of plastic. In the illustrated embodiment, the skirt 44 has openings 60 distributed around its circumference. The openings 60 facilitate fuel flow past the skirt 44 and into the standpipe when the pin cage is disposed at the second position during use of the filter cartridge. The skirt 44 could be made solid (i.e. without openings 60) which would enhance the blockage of contaminants through the opening 30 and into the interior space 18 prior to installation of the filter cartridge when the pin cage is at the first position.

Figure 7:
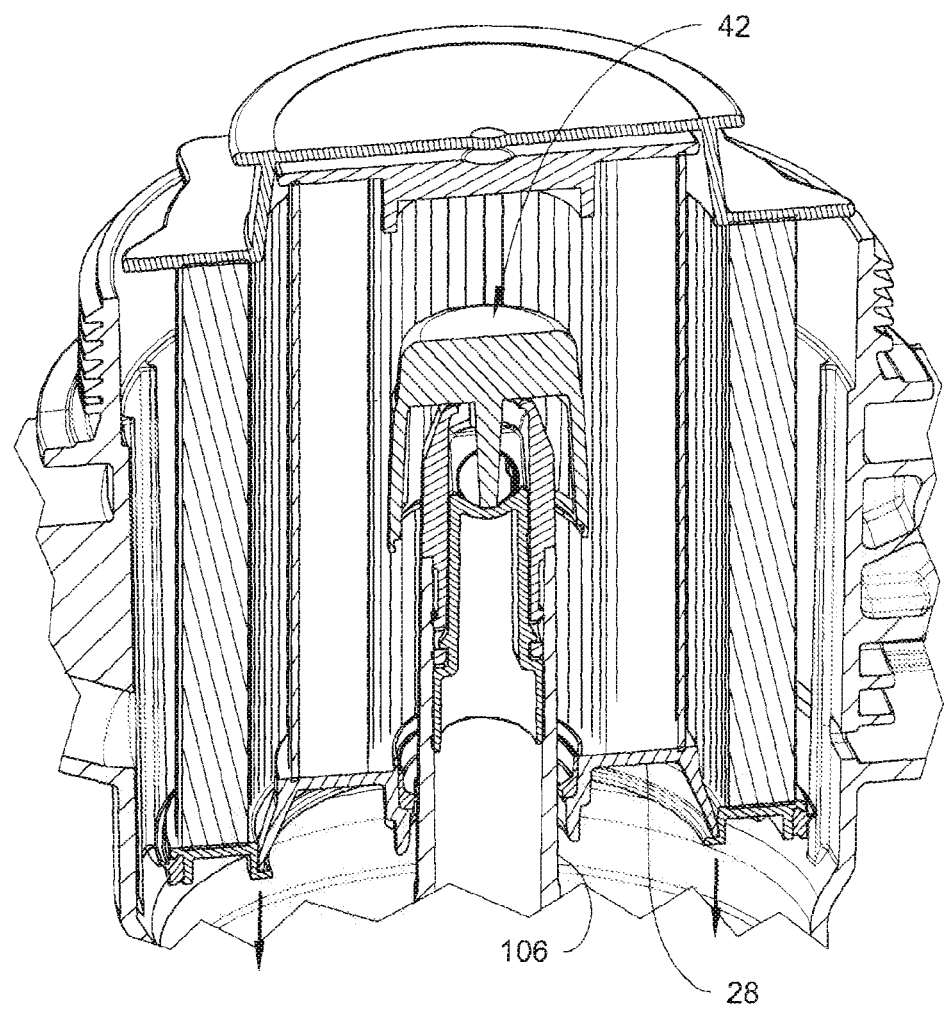
FIG. 7 is a partial perspective, sectional view showing release of the pin cage.
Figure 8:
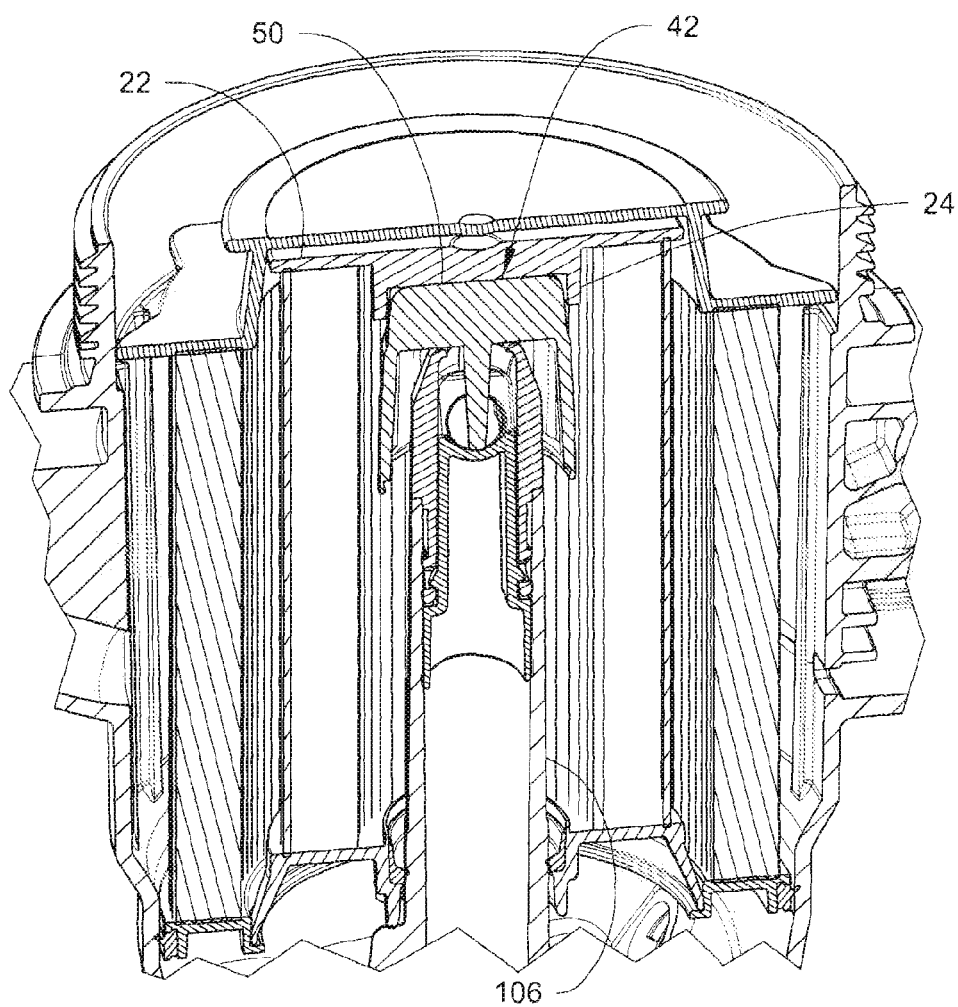
FIG. 8 is a partial perspective, sectional view showing the filter cartridge fully installed.
Figure 9:
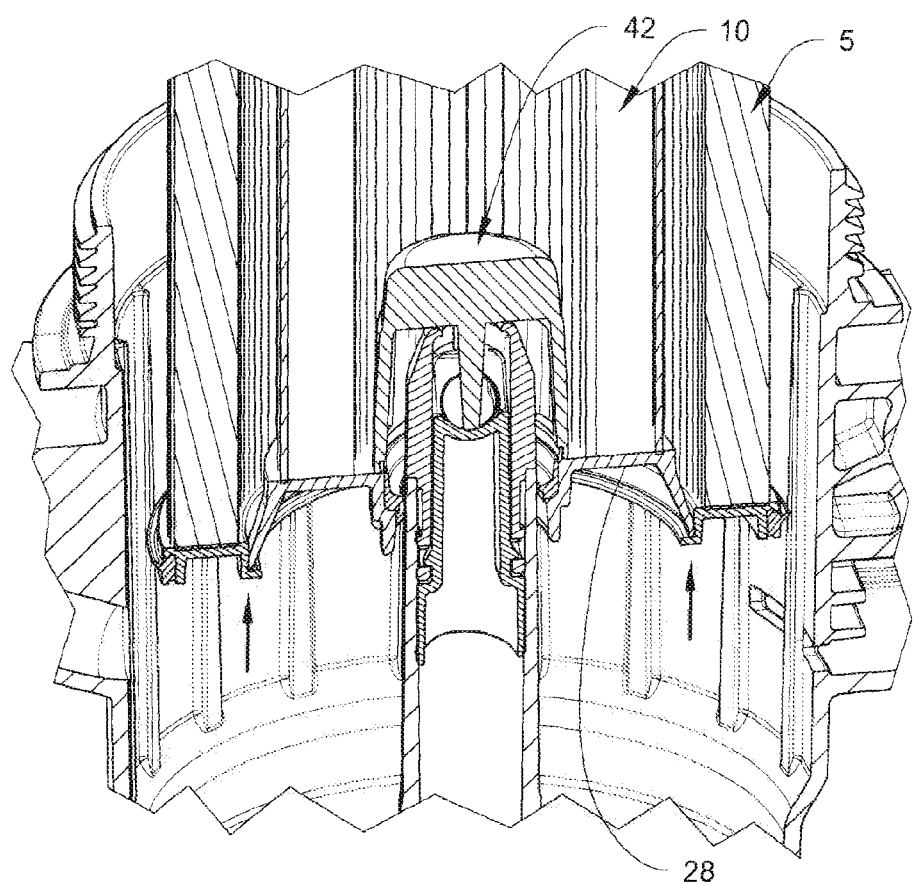
FIG. 9 is a partial perspective, sectional view showing removal of the filter cartridge.

Operation and installation of the filter 10 will now be discussed with reference to FIGS. 5-9 which depict the filter cartridge formed by the combination of the inner filter 10 and the outer filter 5 being installed into a filter housing 100 (FIGS. 5-8) and removed from the filter housing (FIG. 9). In the illustrated example, the filter housing 100 includes a housing body that has a side wall 102 and an end wall (not visible). The side wall 102 and the end wall define a filter cartridge space 104 that is large enough to receive the filter cartridge therein, with the end wall forming a closed end of the space 104. The housing body has an open end generally opposite the end wall, with the open end in use being closed by a lid that closes off the space 104. The housing body also includes an inlet opening through which fuel to be filtered enters the space 104, and an outlet, for example extending from the end wall, through which fuel exits on its way to the engine. Further details on a filter housing can be found in U.S. application Ser. No. 11/937,700. However, it is to be realized that the filter housing 100 could have other configurations than that described herein.

A fluid passageway member in the form of a standpipe 106 is secured to the end wall and extends upwardly into the space 104 toward the open end. The standpipe 106 is generally hollow from its end connected to the end wall to a tip end thereof, thereby defining an internal fuel passage. The fuel passage is in communication with the outlet so that fuel that enters the standpipe 106 can flow from the standpipe and into the outlet to the engine. The standpipe 106 is illustrated as being centrally disposed in the housing 100 coaxial with the central axis of the housing.

The standpipe can have any cross-sectional shape one finds suitable for use. In one example, the standpipe 106 is oval-shaped in cross-section from the bottom end to the tip end. An example of an oval standpipe is disclosed in U.S. Pat. No. 6,884,349. The concepts described herein could be used, individually or in various combinations, with other cross-sectional shapes for example circular-shaped standpipes.

A flow restriction valve 110 is disposed at the tip end of the standpipe 106 to control the flow of fuel into the standpipe. The valve 110 is configured to prevent fuel flow into the standpipe when the filter cartridge is not installed or when an incorrect filter cartridge is installed. The construction and operation of the valve 110 can be like the valve ball construction disclosed in U.S. Pat. No. 6,884,349 or in U.S. application Ser. Nos. 12/058,225 and 12/152,373, which are incorporated herein by reference in their entirety. When the filter cartridge is installed, the pin 52 on the pin cage 42 is designed to extend down through the top of the standpipe and into a position to block the valve ball and prevent the valve ball from reaching a blocking position that would prevent fuel flow into the flow passage of the standpipe. Other types of valves could also be used, for example a valve that is engaged by the pin and as a result of the engagement is moved by the pin from a closed position to an open position. An example of this type of valve actuated by a pin is disclosed in U.S. Pat. No. 6,171,491.

Figure 5:
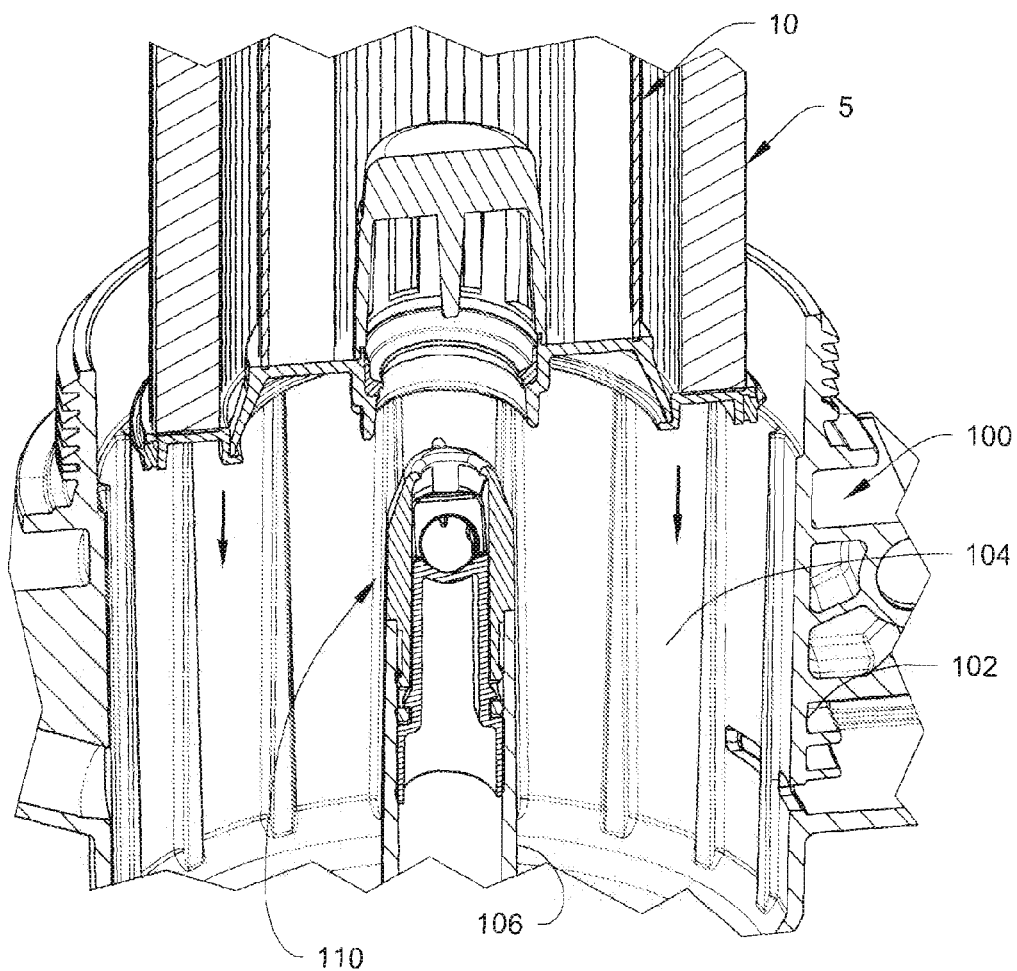
FIG. 5 is a partial perspective, sectional view showing the improved filter cartridge at the beginning of installation onto the standpipe of the filter housing.

FIG. 5 illustrates the filter cartridge at the beginning of installation into the housing 100. At this time, the pin cage 42 is at its first position connected to the bottom end plate of the filter 10.

Figure 6:
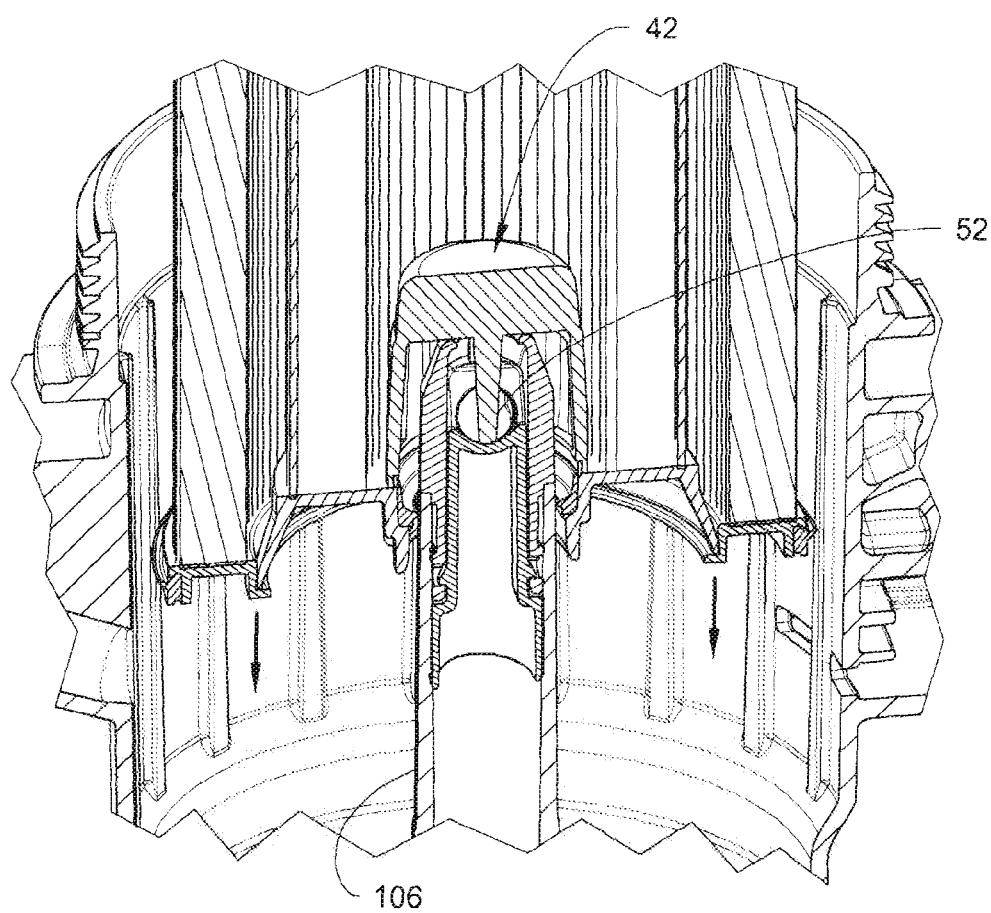
FIG. 6 is a partial perspective, sectional view at another stage of cartridge installation where the standpipe starts to engage the pin cage.

FIG. 6 shows the filter cartridge at a point at the beginning of insertion onto the standpipe 106. The pin cage 42 is still at the first position connected to the bottom end plate. However, the top end of the standpipe 106 starts to engage with the bottom of the ribs 54 on the pin cage cap 50, and the pin 52 extends through an opening in the top of the standpipe.

As the filter cartridge continues to be installed, the engagement between the top end of the standpipe 106 and the ribs 54 creates an upward force on the pin cage 42 which ultimately overcomes the holding force between the lip 38 and the protrusions 56. When the holding force is overcome, the pin cage 42 releases from the bottom end plate and is forced upwardly toward the top end plate 14 by the standpipe, as illustrated in FIG. 7.

FIG. 8 illustrates the fully installed position of the filter cartridge. At this position, the pin cage is at its second position with the pin cage cap 50 received within the space defined by the flange 24 on the upper end plate. This helps to stabilize the pin cage 42 during use. The pin 52 is in its blocking position preventing the ball valve from reaching a flow blocking position. The skirt 44 of the pin cage 42 surrounds the top end of the standpipe and the valve 110. Fuel can reach an opening in the side of the standpipe so as to flow into the standpipe by flowing through the openings 60 in the skirt and by flowing through a gap between the bottom rim 46 of the pin cage and the outside surface of the standpipe. In the case of a solid skirt 44 with no flow openings, fuel can flow through the gap between the bottom of the skirt and the outside of the standpipe.

FIG. 9 illustrates removal of the filter cartridge from the filter housing 100. During removal, the pin cage 42 will contact the bottom end plate 16 as shown in FIG. 9. This ensures that the pin cage remains with the filter cartridge upon removal. It is not typically necessary for the snap connection between the pin cage and the bottom end plate to re-engage since in most instances the filter cartridge will be discarded. However, if the filter cartridge were intended to be re-used, it could be possible to have the snap connection re-engage so that the pin cage resumes it contaminant blocking function until such time as the filter cartridge is installed for re-use.

With reference now to FIGS. 10-14, a flow control valve 150 and an upper end plate of a filter cartridge configured to actuate the flow control valve 150 are illustrated. Although not illustrated for the sake of simplicity, the filter cartridge includes filter media and a bottom end plate each of which can be similar to, or different than, the filter media and bottom end plate described with respect to FIGS. 1-9.

The valve 150 includes a valve housing 152 with an end 154 that is insertable into the upper end of a standpipe (not depicted). When inserted, the valve housing 152 is retained in the standpipe by an interference fit and/or using auxiliary means such as adhesive, and forms the top end of the standpipe. The valve housing 152 can be configured to be used with standpipes of various shapes, such as circular or oval. The valve housing 152 can be made of, for example, plastic.

Figure 13:
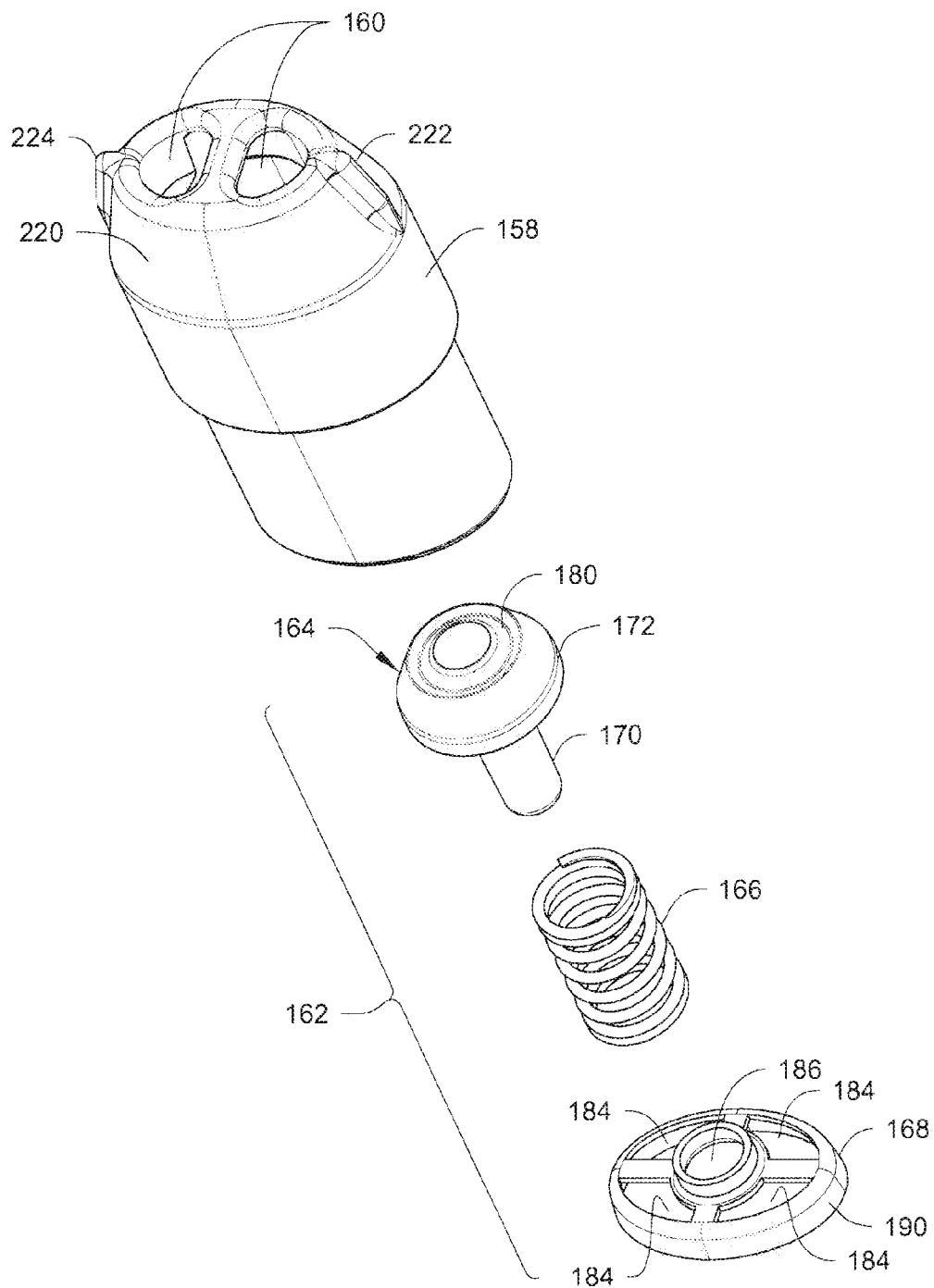
FIG. 13 is an exploded view of the valve assembly within the end of the standpipe.

A shoulder 156 is defined between the end 154 and an upper end 158 of the housing 152. When the housing 152 is fully installed, the shoulder 156 will abut against the upper end of the standpipe to limit insertion of the housing into the standpipe. As best seen in FIG. 13, the upper end 158 includes a pair of actuating holes 160 that allow pins on an installed filter cartridge to extend through the holes and into engagement with a valve assembly 162 disposed inside the housing 152. Instead of a pair of holes 160, one continuous hole through which the pins extend could be used. The holes 160 also form fluid inlet passages through which fluid enters the housing 152 and the standpipe.

The valve assembly 162 comprises a valve poppet 164, a biasing spring 166 and a retainer 168. The poppet 164 includes a stem 170 and a valve head 172. The valve head 172 is generally mushroom-shaped with a central section 174, an angled section 176 extending outwardly and downwardly from the central section, and an axial section 178 extending axially from the angled section. The upward facing surface of the central section 174 includes a circumferential channel 180 that in use receives the ends of non-centered pins 182 that are connected to an upper end plate 184 of a filter cartridge.

Figure 10:
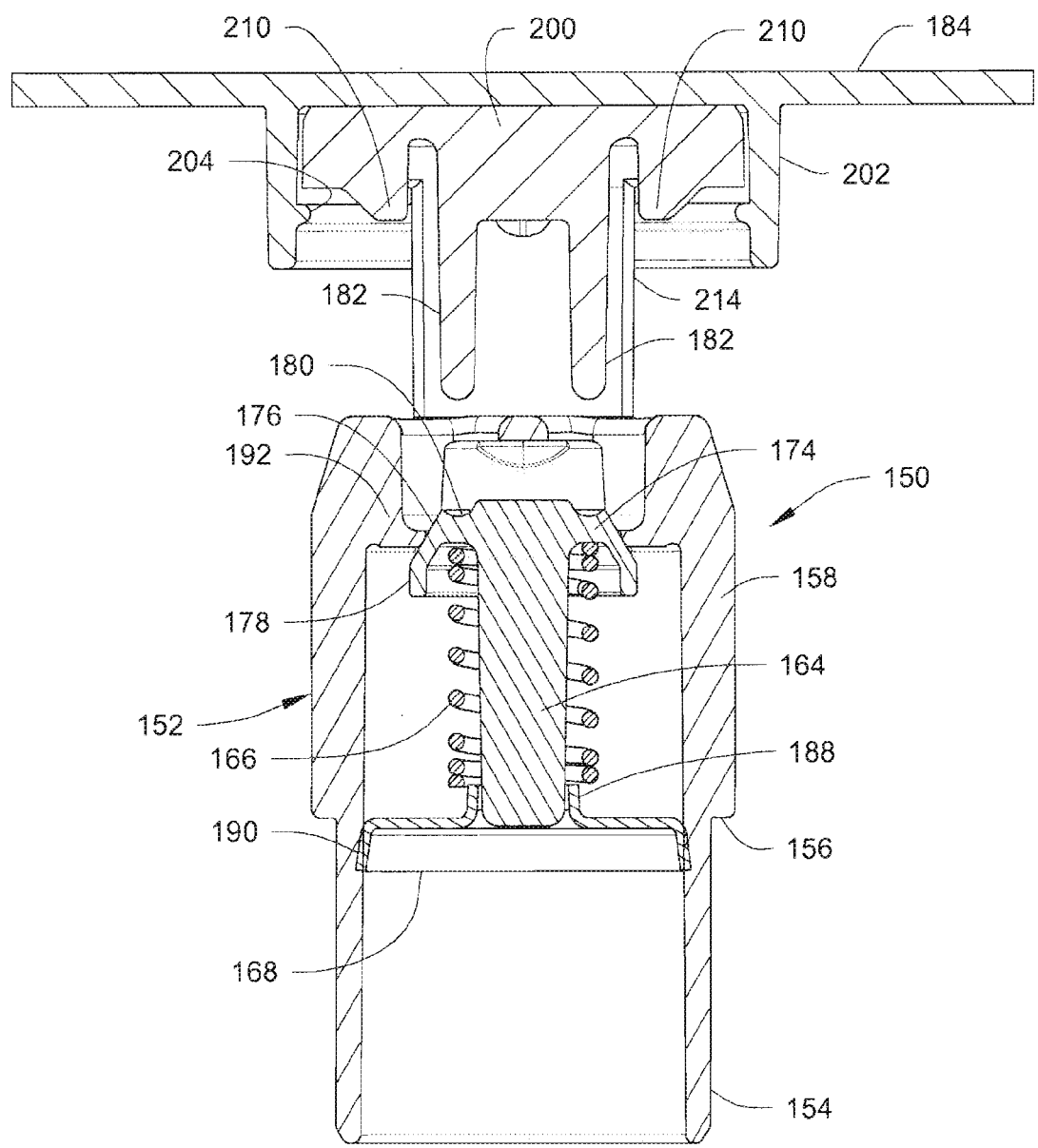
FIG. 10 is a side cross-sectional view of a filter cartridge having a self-aligning, dual pin structure.

The spring 166 is illustrated as coil spring that surrounds the stem 170, with one end of the spring 166 engaged with the bottom of the central section 174. The other end of the spring 166 is engaged with the retainer 168 which is fixed within the valve housing 152. The retainer 168 comprises a plate made of metal or other material that is suitable for performing the functions required of the retainer 168 and which is compatible with the fuel or other fluid flowing through the valve housing. A plurality of openings 184 are formed in the plate to allow fluid flow through the retainer. Four openings 184 are illustrated although a larger or smaller number of openings could be used. The retainer 168 also includes a central opening 186 through which the bottom end of the stem 170 extends. A rim 188 surrounds the opening 168, and the bottom end of the spring surrounds the rim 188. The retainer 168 also includes a side wall 190 that is angled outwardly as shown in FIG. 10. The side wall 190 helps lock the retainer 168 within the housing 152, with the angle of the side wall 190 causing the bottom edge of the side wall 190 to dig into the material of the housing 152 if one tries to remove the retainer. Other means of retaining the retainer 168 in the housing 152 are possible, including but not limited to a snap-fit type of connection, using an adhesive such as epoxy, and other types of retaining mechanisms.

Figure 11:
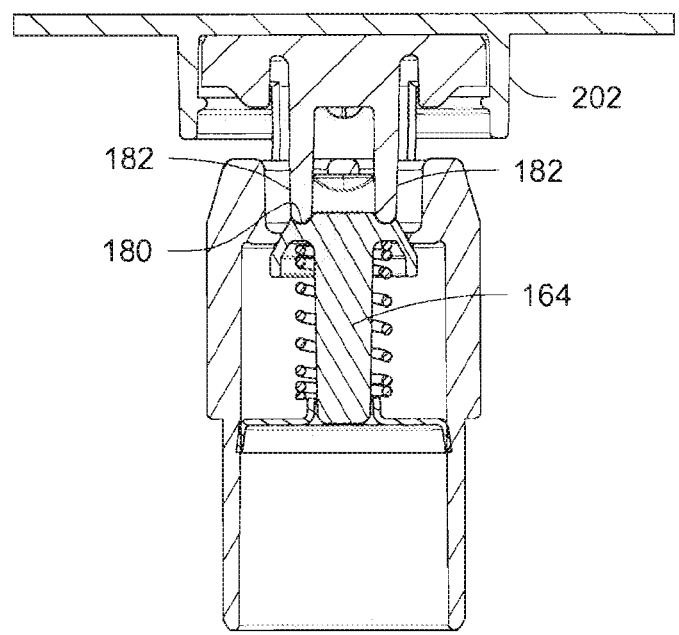
FIG. 11 illustrates the filter cartridge of FIG. 10 beginning to engage a valve disposed at the end of a standpipe.

As shown in FIGS. 10 and 11, the valve poppet 164 is normally biased upward to a sealed position where the angled section 176 of the valve head 172 sealingly abuts against a tubular wall 192 of the housing 152 to prevent fluid flow through the housing 152 and thus through the standpipe. The bottom end of the stem 170 received within the central opening 186, together with the coil spring 166 surrounding the stem 170, help to stabilize the poppet 164 and prevent lateral side-to-side movement or flutter of the poppet 164.

Figure 12:
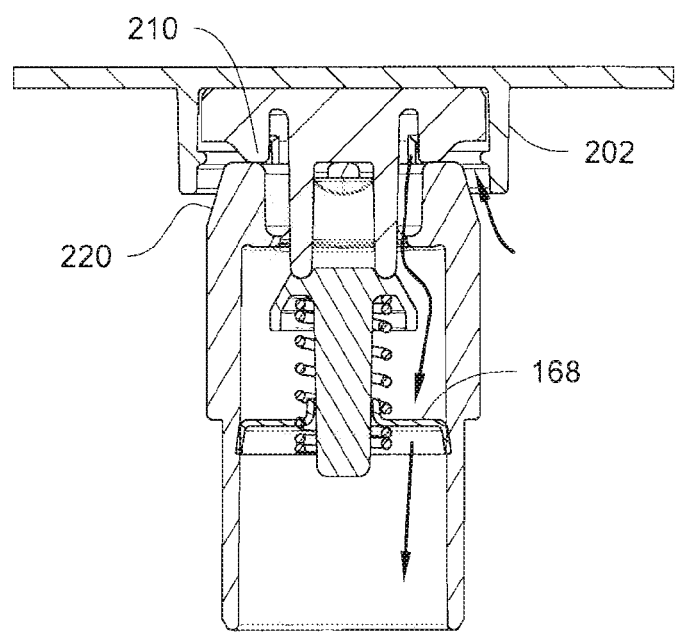
FIG. 12 illustrates the fully installed position of the filter cartridge of FIGS. 10 and 11.

When a correct filter cartridge is installed, the pins 182 extend through the holes 160 and into engagement with the valve head 172 as shown in FIG. 11. The bottom ends of the pins 182 are rounded, and the ends fit into the channel 180. As depicted in FIG. 12, continued installation of the filter cartridge forces the poppet 164 downward off of the tubular wall 192 to allow fluid to flow through the holes 160 and down through the valve housing and into the standpipe.

The diameter of the flow path defined by the interior wall of the upper end 158 of the housing 152 is much greater than the outside diameter of the valve head 172. Therefore, when the valve is opened, fluid flows around the valve poppet and down through the openings 184 in the retainer. The pair of pins 182 received in the channel 180 helps to stabilize the valve, together with the spring and the stem received in the central opening of the retainer, while the valve is in the open position shown in FIG. 12 so that lateral, side-to-side movement or flutter of the poppet is prevented.

During installation of the filter cartridge, it is necessary for the pins 182 to be properly aligned with the holes 160. To facilitate such alignment, the pins 182 are separately attached to the end plate 184 and are rotatable relative to the end plate to help achieve alignment. Returning to FIG. 10, the pins 182 extend from a plate 200. The plate 200 is received with a sleeve 202 that extends downwardly from the end plate 184. The sleeve 202 includes an inner circumferential ridge 204 that is used to secure the plate 200 within the sleeve 202. As evident from FIG. 10, the thickness of the plate 200 adjacent its outer edge is less than the distance between the bottom surface of the end plate 184 and the ridge 204. In addition, the outer diameter of the plate is slightly less than the inner diameter of the sleeve 202. Therefore, clearance space is left between the plate 200 and the end plate 184 that allows the plate 200 to freely rotate relative to the end plate 184.

The filter media of the filter cartridge would be connected at one end thereof to the end plate 184 so as to generally surround the sleeve 202 similar to the filter media 12 shown in FIG. 1. Therefore, in the filter cartridge of FIGS. 10-14, the filter media will define an interior space in which the pins 182 are disposed. Likewise, the other end of the filter media would be connected to the bottom end plate similar to the filter media shown in FIG. 1.

The pins 182 (as well as the pin 52) can have shapes other than that illustrated in the drawings, and each pin 182 need not have the same shape. For example, the pins can be shaped similar to saw-teeth or they can be rectangular in shape.

Figure 14:
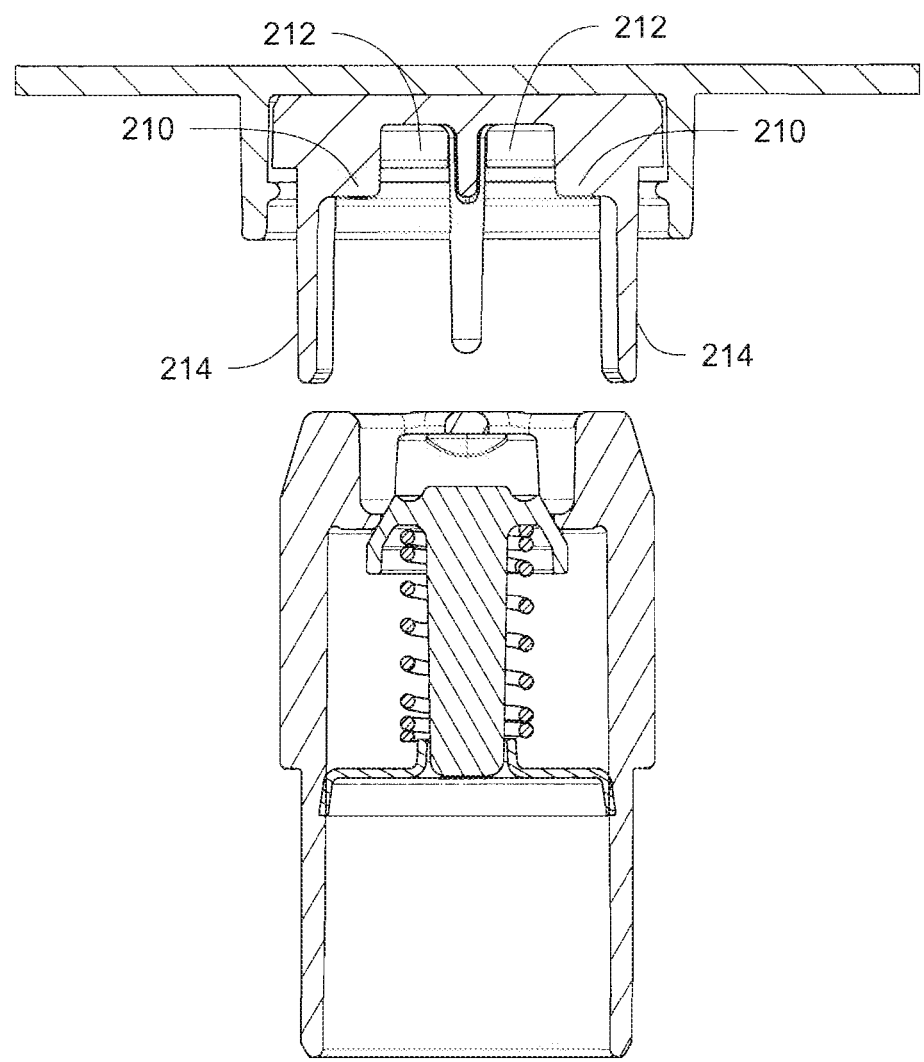
FIG. 14 illustrates alignment features used to align the pins during installation.

With reference to FIGS. 10 and 14, the plate 200 also includes circumferentially spaced ribs 210 that define fluid flow paths 212. A pair of diametrically opposed alignment ribs 214 extend downwardly from the plate 200.

With reference to FIG. 13, the upper end 158 of the valve housing 152 is oval in shape. The top end 220 is shaped as a tapered cone. A pair of protrusions 222, 224 are formed on the end 220, with the protrusions 222, 224 including angled outer edges. Similar angled protrusions are described in U.S. patent application Ser. No. 11/937,700. When the filter cartridge is being installed, if the pins 182 are not in the proper orientation, the alignment ribs 214 will engage with the protrusions 222, 224, which will cause the plate 200 to rotate to the correct orientation so that the pins are aligned with the holes. This automatic alignment feature allows use of the non-centered pins 182, without requiring manufacturing to align the non-centered pins with the standpipe opening, which in the illustrated example would be oval, in the bottom end plate. The automatic alignment feature is also useful in an application where the valve openings are not always in the same orientation.

Turning to FIG. 12, when the filter cartridge is installed, the bottom ends of the ribs 210 rest on the top surface of the conical end 220 of the valve housing 152. The alignment ribs 214 will extend downward on opposite sides of the valve housing 152. The sleeve 202, which is larger than the size of the conical end 220, is spaced from the conical end 220 to allow fluid to flow between the sleeve and the conical end. The fluid then flows through the passages 212 between the ribs 210, into the holes 160, past the valve poppet and into the standpipe as shown by the arrows in FIG. 12.

The concepts described with respect to FIGS. 1-9 can be used, individually or collectively, with the concepts described with respect to FIGS. 10-14. For example, the sliding pin cage concept can be used with the concepts described in FIGS. 10-14. In another example, the non-centered pins that are rotatable relative to the end plate in FIGS. 10-14 can be used with FIGS. 1-9.

In addition, the moveable valve interaction pin concepts described herein could be applied to non-top load filter cartridges (i.e. filter cartridges that are loaded through a top end of a filter housing), including spin-on or bottom load filter cartridges.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A filter cartridge comprising:
   filter media having first and second ends and defining an interior space;
   a first end plate connected to the first end of the filter media;
   a second end plate connected to the second end of the filter media, the second end plate includes a standpipe opening; and
   a valve interaction pin disposed within the interior space, the valve interaction pin includes a fixed end and a free end, the fixed end is positioned closer to the first end plate than to the second end plate, and the valve interaction pin being moveable relative to the filter media from a first position adjacent to the second end plate in the filter cartridge to a second position in the filter cartridge, the valve interaction pin including a snap connection mechanism configured to temporarily hold the valve interaction pin in the first position prior to installation in a filter housing.

2. The filter cartridge of claim 1, wherein the valve interaction pin is movable in a direction parallel to a longitudinal axis of the filter media.

3. A filter cartridge comprising:
   filter media having first and second ends and defining an interior space;
   a first end plate connected to the first end of the filter media;
   a second end plate connected to the second end of the filter media; and
   a valve interaction pin disposed within the interior space, the valve interaction pin being moveable relative to the filter media from a first position to a second position;
   the first end plate is an upper end plate that is closed, the second end plate is a bottom end plate that includes a standpipe opening, the first position is adjacent to the bottom end plate and the second position is adjacent to the upper end plate; and
   the valve interaction pin includes a snap connection mechanism configured to temporarily hold the valve interaction pin in the first position prior to installation in a filter housing.

4. The filter cartridge of claim 3, further comprising a pin cage disposed within the interior space, the pin cage is movable from a position adjacent to the bottom end plate to a position adjacent to the upper end plate, and the valve interaction pin is fixed to the pin cage.

5. The filter cartridge of claim 4, wherein the upper end plate includes a circular flange on an inside surface thereof within the interior space and projecting toward the bottom end plate, and a plurality of stiffening ribs connected to the inside surface and to the circular flange, the stiffening ribs having an axial height less than an axial height of the circular flange to define a pin cage receiving space.

6. The filter cartridge of claim 5, wherein the pin cage comprises a cylindrical skirt having a bottom rim and a top rim, a closed cap connected to the top rim that is sized to fit within the pin cage receiving space, the valve interaction pin is fixed to the closed cap, and the connection mechanism is on the bottom rim and on the bottom end plate.

7. A filter cartridge for installation into a filter housing having a standpipe defining a fluid passageway, there being a valve in the standpipe that controls fluid flow through the standpipe, the filter cartridge comprising:
   filter media having an upper end and a lower end and defining an interior space;
   an upper end plate connected to the upper end of the filter media, the upper end plate is without fluid flow openings;
   a bottom end plate connected to the lower end of the filter media, the bottom end plate includes a standpipe opening that allows passage of the standpipe through the bottom end plate when the filter cartridge is installed into the filter housing and a gasket surrounding the standpipe opening that seals with the standpipe when the filter cartridge is installed in the filter housing; and
   a valve interaction pin disposed within the interior space that is configured to interact with the valve in the standpipe when the filter cartridge is installed in the filter housing, the valve interaction pin being moveable relative to the filter media during installation into the filter housing from a first position in the filter cartridge adjacent to the bottom end plate to a second position in the filter cartridge, the valve interaction pin including a snap connection mechanism configured to temporarily hold the valve interaction pin in the first position prior to installation in the filter housing.

8. The filter cartridge of claim 7, wherein the second position is adjacent to the upper end plate.

9. The filter cartridge of claim 7, wherein the valve interaction pin is fixed to a pin cage that is disposed within the interior space and that is movable during installation of the filter cartridge into the filter housing from the first position adjacent to the bottom end plate to the second position adjacent to the upper end plate.

10. The filter cartridge of claim 9, wherein the pin cage comprises a cylindrical skirt having a bottom rim and a top rim, a closed cap connected to the top rim, and the connection mechanism is on the bottom rim.

* * * * *